United States Patent Office 3,637,680
Patented Jan. 25, 1972

3,637,680
2-(3-TRIFLUOROMETHYL)-PHENYL
MORPHOLINES
Roland Yves Mauvernay, Norbert Busch, Jacques Moleyre, and Jacques Simond, Puy-de-Dome, France, assignors to Societe Anonyme: Centre Europeen de Recherches Mauvernay, Riom, Puy-de-Dome, France
No Drawing. Filed Feb. 28, 1969, Ser. No. 803,400
Claims priority, application France, Mar. 4, 1968, 142,279; May 29, 1968, 153,287; June 18, 1968, 155,482; Aug. 27, 1968, 164,260; Nov. 15, 1968, 173,894; Feb. 19, 1969, 6904203
Int. Cl. C07d 87/30
U.S. Cl. 260—247  6 Claims

ABSTRACT OF THE DISCLOSURE

New 2,4-disubstituted tetrahydro 1,4-oxazines of formula:

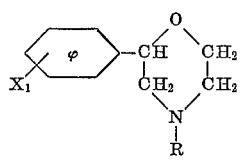

wherein R is a hydrogen atom or an alkyl radical such as a methyl, propyl, butyl, isopropyl, isobutyl, pentyl, hexyl, heptyl, isopentyl, or cyclohexyl, radical, an alkenyl radical such as an allyl radical, an aryl radical or an arylalkyl radical such as benzyl or phenylethyl radical, and $X_1$ is a halogen or a —$CF_3$ group, in the meta or para positions.

These compositions are obtained by a three step process in which the process is started with a β-halogenated vinyl ether to which bromine is added, and an organomagnesian compound and a primary amine of the formula R—$NH_2$ are successively reacted.

These compounds are useful as medicaments or as intermediaries in the synthesis of pharmaceutical products. Essentially, they have a tranquilizing effect on the central nervous system and also possess an anti-inflammatory and analgesic activity.

This invention relates to new tetrahydro-1,4-oxazines or morpholines and particularly their 2,4-disubstituted derivatives. Another object of the invention is a process for obtaining such derivatives and their applications, especially as medicaments or intermediaries in the synthesis of pharmaceutical products.

In the prior art, many ways of preparing compounds of this type have been suggested. A recent study [König et al., Angew. Chem. 77(7), p. 329 (1965)], resumes most of the known methods for preparing tetrahydro-1,4 oxazines and their substituted derivatives and may conveniently be taken as a basic bibliographical reference.

To illustrate the state in the art, the two processes which have been most often used in the prior art will be described.

A first process consists in condensing primary amines with bis (β-halogenated) derivatives of ether oxides. Thus, for instance, United States Pat. No. 3,155,656 describes the synthesis of 2,4,6-trimethyl tetrahydro 1,4-oxazine according to this process.

Such a process has a fairly restricted field of application and does not permit all the desired morpholine compounds to be easily obtained.

A second process consists in dehydrating for cyclization bis (2-hydroxy ethyl) amines either with sulphuric acid (United States Pat. No. 3,112,311), or paratoluenesulfonic acid (German Pat. No. 1,137,439), or with pyrophosphoric acid (United Kingdom Pat. No. 861,463).

This basic process has been the object of a certain number of variants of application, of which the main ones will now be briefly reviewed.

König et al., mentioned hereinabove suggested the following succession of steps: condensation of nitroalkanes with aldehydes, reduction of the group —$NO_2$ into —$NH_2$, condensation of the aminoalcohols so obtained with epoxides and finally, cyclization by dehydration of suitably substituted diethanolamines.

Epoxides can also be condensed with primary amines according to known processes and cyclization is then carried out.

This reaction provides 2,6 symmetric disubstituted tetrahydrooxazines 1.4 [Cherbulliez et al. Helv. Chim. Acta 47 (7), p. 2106 (1964)].

With respect to this, it should be noted that in certain cases, and according to R. E. Parker and N. S. Isaacs' research [Chemical Reviews 59 (4), August 1965], the last mentioned process can provide primary and secondary amino-alcohol mixtures of the type;

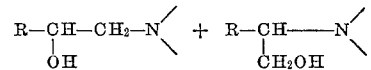

According to another known process (J. Klosa: J. Prakt Chem. 21 (1–2), 12–17 (1963)), racemic norephedrin is condensed with glycol chlorohydrin, and tetrahydro-1,4-oxazine is obtained by cyclizing dehydration.

According to another known process [Zymalkowski et al., Arch. Pharm. 294, 453–468 (1961)], amino-alcohols are condensed with glyoxylic alcohol by catalytic hydrogenation, then tetrahydro-1,4-oxazine is obtained by cyclizing dehydration.

The prior process [Drefahl et al., Chem. Ber. 99 (8), p. 2716 (1966)] in which the suitably substituted amino-alcohols are condensed with ethyl oxalate to obtain oxazine-diones will be remembered. It is, however, known that the reduction of oxazine-diones presents difficulties, as is seen from the article by Winterfeld et al., Ann. Chem. 685, 181–186 (1965).

Finally, French Pat. No. 1,535,615 describes a process for producing 2,4- and 2,2,4-substituted tetrahydro 1,4-oxazines. The preferred form of embodiment of this process consists essentially in carrying out, in a first step, an alkoxy-bromonation of an olefin of the formula:

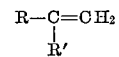

by tertiarybutyl hypobromite in the presence of glycol chlorohydrin to obtain derivatives of the formula:

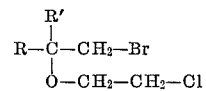

These compounds are then condensed with primary amines to obtain the corresponding tetrahydro-1,4-oxazines.

The abovementioned process requires the use of relatively costly raw materials in cases where the substituent at 2 is a phenyl ring substituted with one or more halogen atoms of a —$CF_3$ group.

The object of the invention is a new three-step process permitting 2,4-disubstituted tetrahydro 1,4-oxazines to be easily obtained by the use of cheap easily obtained raw materials.

The process of the invention is characterized in that the following successive three reaction steps are carried out:

(1) the addition reaction of bromine to a β-halogenated vinyl ether of Formula I

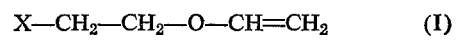

wherein X is a halogen, preferably chlorine, which provides a derivative of Formula II $$X-CH_2-CH_2-O-CH-CH_2-Br$$
$$|$$
$$Br \qquad (II)$$

(2) condensation of the derivative of Formula II with a organomagnesian compound of Formula III

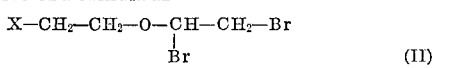

(III)

wherein $X_1$ is a halogen or a —$CF_3$ group in the meta or para position which provides a compound of Formula IV

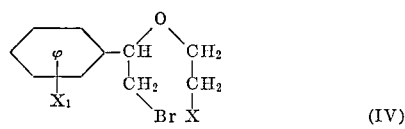

(IV)

(3) condensation of the compound of Formula IV with a primary amine of the formula R—$NH_2$ wherein R is any hydrocarbon radical which can include heteroatoms, preferably an alkyl, cycloalkyl, alkenyl, aryl or arylalkyl radicals, giving the desired compound of Formula V

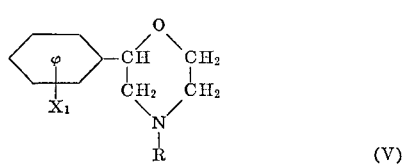

(V)

wherein R and $X_1$ are the same as hereinabove.

Reaction (1), the addition of bromine to β halogenated vinyl ethers (I) is effected at a temperature below the normal, and preferably less than 0° C., and particularly between —15° C. and —10° C., in a solvent or diluent medium such as a chloroform medium. The mole ratio of bromine to the β-halogenated vinyl ether is about 1. After the addition has ended, the solvent may be partially recovered by distillation of the reaction medium.

The condensation reaction (2) of the bromine derivatives (II) with the organomagnesian compounds (III) can be carried out in the conditions for condensation known as Boord condensation [H. Krauch and H. Kunz, Reaktionen der organischen Chemie, 3rd edition, p. 88 (1966)]. The reaction can advantageously be carried out in an aliphatic or cyclic ether solvent, such as ethyl ether, at the boiling point of ether, maintaining a slight reflux in said solvent. The mole ratio of the bromine derivative (II) to the organomagnesian compound (III) is about 1.

The condensation of the derivatives of Formula IV with the primary amines is effected in proportions of approximately one molecule of the derivative (IV) for three molecules of primary amine. The reaction is carried out in benzenic hydrocarbon solvent, such as toluene, at moderately high temperatures of the order of 100° C., and optionally in an autoclave.

The process of the invention is particularly advantageous for the production of 2-(3-trifluoromethyl) phenyl tetrahydro 1,4-oxazines substituted at 4 by the radical R, which is more particularly an alkyl, cycloalkyl, alkenyl, aryl or arylalkyl group.

It should be noted that, to obtain products having the Formula V, wherein R is a hydrogen atom or a methyl radical, $X_1$ being the same as hereinabove (halogen or —$CF_3$), the amine R—$NH_2$ used in step (3) is a gas. In practice, it is more advantageous to obtain these compounds wherein R is H or —$CH_3$ starting with another compound of Formula V wherein

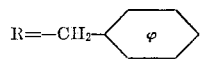

Consequently, according to a variant of the process of the invention to obtain 2-(3-trifluoromethyl)phenyl tetrahydro 1,4-oxazine of Formula VI

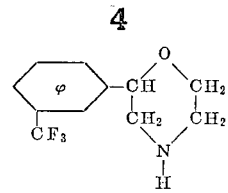

(VI)

there is effected catalytic hydrogenation of the compound of Formula V wherein

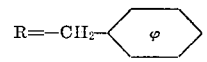

i.e. 2-(3-trifluoromethyl)phenyl-4-benzyl tetrahydro 1,4-oxazine, which has the effect of removing the benzyl substituent from the latter compound.

Conventional catalytic hydrogenation conditions are used. The reaction occurs readily at ambient temperature in a hydroalcoholic medium and at a pressure in the range of a few kg./cm.$^2$ of hydrogen, the catalyst being activated carbon with 5% palladium. The reaction can be illustrated by the following diagram:

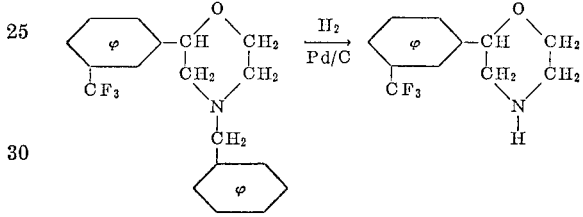

Compound (VI) so obtained can be used as the starting compound for the production of the compound of Formula V wherein R=—$CH_3$.

Compound (VI) can thus be methylated in position 4 by heating at moderate temperatures, in the order of 100° C., in the presence of a mixture of formic acid and aqueous formaldehyde, in accordance with the method described in "Organic Reactions," vol. V, p. 307 (Eschweiler Clark). This reaction can be schematized by the following equation:

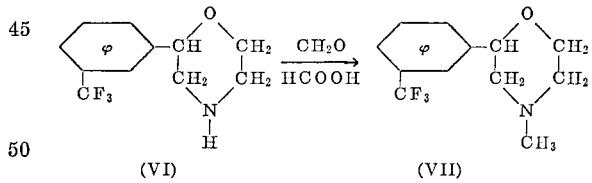

(VI)          (VII)

Therefore, the invention as a whole concerns 2,4-disubstituted tetrahydro-1,4-oxazines of Formula VIII

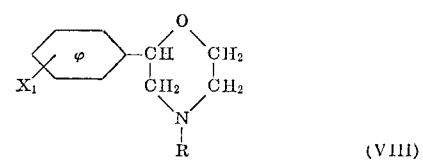

(VIII)

wherein R is a hydrogen atom or an alkyl radical such as methyl, propyl, butyl, isopropyl, isobutyl, pentyl, hexyl, heptyl, isopentyl or cyclohexyl radical, an alkenyl radical such as an allyl radical, an aryl radical or an arylalkyl radical such as a benzyl or phenylethyl radical, and wherein $X_1$ is a halogen or a —$CF_3$ group, in the meta or para position.

Compounds of Formula VIII constitute new products, at least in the present state of the available literature. They possess useful properties which make them usable as medicaments, and notably tranquilizing, analgesic and anti-inflammatory properties.

The process of the invention and the properties of the new compounds, as medicaments, are illustrated in the following examples:

EXAMPLE I

First step: 1,2-dibromo, 2-(2-chloro)ethoxy ethane 640 g. of bromine (4 M) are added dropwise, with stirring, to 426 g. (4 M) of 2-chloro ethyl vinyl ether dissolved in 1.040 ml. of chloroform maintained at −10° C.

When addition is ended, the solvent and then the residue are distilled in vacuum to obtain 690 g. of product $E_{13}=102°$ C.: $n_D^{23}=1.5305$. Yield=65%

Second step: 2-(3-trifluoromethyl)2-(2-chloro)ethoxy-1-bromo ethane (3-trifluoromethyl)phenyl magnesium bromide is prepared under the normal conditions for magnesian derivatives, from 48.6 g. of magnesium turnings and 455.7 g. of (3-trifluoromethyl)bromobenzene and 1.5 ml. anhydrous ether.

To the solution of the magnesium compound so obtained the following solution is added dropwise, with stirring so as to maintain a slight reflux of ether:

1,2-dibromo, 2-(2-chloro)ethoxy ethane: 550 g.
Anhydrous ether: 300 ml.

After the addition, reflux heating is continued for two hours, cooling is carried out and there is hydrolized by the mixture:

Ice: 500 g.
Concentrated HCl: 200 ml.

The organic phase is decanted, washed in ClNa saturated water and dried on anhydrous $SO_4Na_2$; the ether is distilled and the residue is rectified in vacuum to obtain 361 g. of the product.

$E_{0.1}=98°$ C. $n_D^{20°}=1.4970$. Yield=54%

According to gas phase chromatography, the product so obtained is about 95% pure and it can be used in further reactions without a second rectification.

Third step: 2-(3-trifluoromethyl)phenyl, 4-isopropyl tetrahydro, 1,4-oxazine hydrochloride The following mixture is heated in an autoclave at 100° C.:

2-(3-trifluoromethyl)2-(2-chloro)-ethoxy 1-bromo ethane: 33.15 g. (0.1 M)
Isopropylamine: 20 g. (0.34 M)
Toluene: 100 ml.

After filtration of the isopropylamine hydrochloride and bromohydrate, the solvent is stripped and the residue is admixed with HCl∼4 N and the aqueous phase is washed with ether. The aqueous phase is treated with 50% aqueous NaOH, the amine is ether-extracted and, after drying on anhydrous $SO_4Na_2$, the ether is distilled and the residue is rectified in vacuum to obtain 14 g. of the product.

$E_3=99°$ C. $n_D^{24°}=1.4751$. Yield=50%

The hydrochloride is crystallized by adding ethyl acetate to the base and then adding the necessary amount of pur alcohol saturatd in dry HCl. M.P.=164° C.

*Analysis.*—Cal'cd for $C_{14}H_{19}NClF_3O=309.77$ (percent): N, 4.52; Cl⁻, 11.44. Found (percent): N, 4.49; Cl⁻, 11.40.

EXAMPLE 2

2-(3-trifluoromethyl)-phenyl 4-allyl tetrahydro, 1,4-oxazine hydrochloride

This compound is obtained in the same conditions as those described for the third step of Example 1 hereinabove, with:

18 g. of allylamine 33.15 g. (0.1 M) of 2-(3-trifluoromethyl)2-(2-chloro)ethoxy 1-bromo ethane such as is produced in the second step of Example 1.

After distillation, there is obtained 13.5 g. of product.

$E_2=103°$ C. $n_D^{21.4°}=1.4828$. Yield=51%

The hydrochloride is obtained in accordance with the conditions described for obtaining hydrochloride in Example 1 hereinabove. M.P.=140° C.

*Analysis.*—Calc'd for $C_{14}H_{17}NClF_3O=307.75$ (percent): N, 4.55; Cl⁻, 11.44. Found (percent): N, 4.50; Cl⁻, 11.50.

EXAMPLE 3

2-(3-trifluoromethyl)phenyl, 4-cyclohexyl tetrahydro 1,4-oxazine hydrochloride

The following are reflux heated for ten hours:

33.15 g. (0.1 M) of 2-(3-trifluoromethyl)2-(2-chloro) ethoxy 1-bromo-ethane obtained from the second stage of Example 1.
27.7 g. of cyclohexylamine (0.3 M) in 100 ml. of toluene.

Operations similar to those of Examples 1 and 2 hereinabove are then carried out to obtain 19 g. of product.

$E_1=146°$ C. $n_D^{24°}=1.4945$. Yield=60%.

The hydrochloride is obtained as in Examples 1 and 2 hereinabove. M.P.=190° C.

*Analysis.*—Calcd. for $C_{17}H_{23}NClF_3O=349.83$ (percent): N, 4.00; Cl⁻, 10.13. Found (percent): N, 4.05; Cl⁻, 10.20.

EXAMPLE 4

2-(3-trifluoromethyl)phenyl, 4-benzyl tetrahydro 1,4-oxazine hydrochloride

The reaction is carried out as in Example 3, but using 0.3 M, or 32.1 g. benzylamine instead of 0.3 M of cyclohexylamine, to obtain 18 g. of the abovementioned product.

$E_2=140°$ C. $n_D^{22°}=1.5195$. Yield=56%.

The hydrochloride is obtained as hereinabove. M.P.=152° C.

*Analysis.*—Calcd. for $C_{18}H_{19}NClF_3O=357.8$ (percent): N, 3.91; Cl⁻, 9.90. Found (percent): N, 3.90; Cl⁻, 10.00.

EXAMPLE 5

2-(3-trifluoromethyl)phenyl, 4-n-butyl tetrahydro 1,4-oxazine hydrochloride

The operation is carried out as in Example 3, but with 18.9 g. of n-butylamine. 15 g. of the product defined hereinabove is obtained.

$E_2=112°$ C. $n_D^{22°}=1.4710$. Yield=52%.

Hydrochloride: M.P.=153° C.

*Analysis.*—Calcd. for $C_{15}H_{21}NClF_3O=323.79$ (percent): N, 4.32; Cl⁻, 10.91. Found (percent): N, 4.35; Cl⁻, 11.00.

EXAMPLE 6

Production of 2-(3-trifluoromethyl)phenyl tetrahydro 1,4-oxazine (VI)

139 g. of 2-(3-trifluoromethyl)phenyl 4-benzyl tetrahydro 1,4-oxazine in the form of hydrochloride, dissolved in 250 ml. ethanol at 96% and 100 ml. water, are subjected to catalytic hydrogenation in the presence of 14 g. of activated carbon with 5% palladium (temperature: 20° C.—Initial pressure: 3.5 kg./cm.²).

The theoretical amount of hydrogen is absorbed in 6 hours. The reaction is stopped, the compound is filtered to separate the catalyst, and after having vacuum stripped the solvent and toluene formed, the residue is alkalized by NaOH at 40%. The desired amine is ether-extracted and the residue vacuum rectified.

63 g. of a colourless, amine-scented oil is thus obtained. $E_{10}=132°$ C. $n_D^{22°}=1.4852$. Yield=70%.

Chromatographic analysis shows it to be 98-99% pure. By dissolving the amine in anhydrous ether and adding HCl saturated pure ethanol, the hydrochloride is obtained in the form of a water- and alcohol-soluble, ethyl acetate-insoluble white crystalline powder.

The physico-chemical characteristics of the hydrochloride are as follows: M.P.=139° C.

Calcd. for $C_{11}H_{13}NF_3ClO=267.69$ (percent): Cl$^-$, 13.24; N, 5.23. Found (percent): Cl$^-$, 13.20; N, 5.23.

EXAMPLE 7

Preparation of 2-(3-trifluoromethyl)phenyl 4-methyl tetrahydro 1,4-oxazine (VII)

23.1 g. of compound (VI) prepared as in Example 6 is added, with cooling, to 30 g. of formic acid at 98%, and 12 g. of aqueous formaldehyde at 30% are then added to this solution.

The mixture is heated in a water bath for 5 hours. After cooling, 20 ml. of concentrated HCl are added, then the product is vacuum concentrated. 50 ml. of water are added to the residue and the product is alkalised with aqueous NaOH at 40%. The desired amine is ether-extracted and, after having stripped the solvent, the product is vacuum rectified to obtain 18 g. of an amine-scented colourless oil:

$E_{10}=124°$ C. $n_D^{22°}=1.475$. Yield=73%.

Chromatographic analysis shows it to be 99% pure. The hydrochloride is prepared in the same manner as in example and consists of a white crystalline powder having the following physico-chemical characteristics:

Water- and alcohol-soluble, M.P.=168° C.

Calcd. for $C_{12}H_{15}NF_3ClO=281.717$ (percent): Cl$^-$, 12.58; N, 4.97. Found (percent): Cl$^-$, 12.50; N, 5.02.

EXAMPLE 8

Preparation of 2-(3-trifluoromethyl)phenyl, 4-n-hexyl tetrahydro 1,4-oxazine hydrochloride This compound is obtained under the same conditions as those described in Example 1, except that, in the third step, there is reacted:

30.3 g. (0.3 M) of n-hexylamine.
33.15 g. (0.1 M) of 2-(3-trifluoromethyl), 2-(2-chloro) ethoxy, 1-bromo ethane as is obtained in the second synthesis step of Example 1.

17 g. of the product defined hereinabove are thus obtained: Yield=53%.

The hydrochloride is crystallized by adding ethyl acetate to the base and then adding thereto the necessary amount of pure alcohol saturated with dry HCl: M.P.=149° C.

EXAMPLE 9

Preparation of 2-(3-trifluoromethyl)phenyl, 4-n-pentyl tetrahydro 1,4-oxazine hydrochloride This compound is prepared by the same process as is described in Example 8 hereinabove, but 26.1 g. (0.4 M) of n-pentylamine is used instead of 30.3 g. (0.3 M) of hexylamine.

15.6 g. of the product defined hereinabove are obtained: Yield=52%.

The hydrochloride is obtained under the same conditions as those described in Example 8 hereinabove for producing hydrochloride: M.P.=134° C.

EXAMPLE 10

Preparation of 2-(3-trifluoromethyl)phenyl,4-n-propyl tetrahydro 1,4-oxazine hydrochloride This compound is obtained under the same conditions as those described in Example 8 hereinabove, but 20 g. (0.34 M) of n-propylamine are used instead of 30.3 g. of hexylamine.

15 g. of the product defined hereinabove are obtained; Yield=54%.

The hydrochloride is obtained in accordance with the conditions described for obtaining the hydrochloride of Example 8 hereinabove; M.P.=183° C.

EXAMPLE 11

Preparation of 2-(3-trifluoromethyl)phenyl, 4-(2-phenylethyl) tetrahydro 1,4-oxazine hydrochloride This compound is obtained under the same conditions as those described for Example 8 hereinabove, but 36.3 g. (0.4 M) of 2-phenyl ethylamine are used instead of 30.3 g. of hexylamine.

17 g. of the product described hereinabove are obtained, Yield=51%.

The hydrochloride is obtained by the same methods as are described in the preceding Example 8 for hydrochloride production: M.P.=246° C.

A certain number of compounds which are representative of Formula VIII hereinabove were produced in the same manner as the preceding examples, and these have been brought together in the following Table A with the compounds which have already been described in the examples given above.

For all the compounds in Table A, the meaning of R is given and the radical $X_1$ is a —$CF_3$ group in the meta position:

TABLE A

| Identification number | Compound, meaning of R in the Formula VIII | Hydrochloride melting point (° C.) | Solubility |
|---|---|---|---|
| 1766 | —CH(CH$_3$)$_2$ | 164 | Water-alcohol-soluble, ether insoluble. |
| 1767 | —φ (phenyl) | 190 | Do. |
| 1784 | —CH$_2$—CH=CH$_2$ | 140 | Water-alcohol-soluble, ether, ethyl acetate insoluble. |
| 1785 | n(C$_4$H$_9$) | 153 | Water-alcohol-soluble, ethyl acetate insoluble. |
| 1786 | —CH$_2$—(cyclohexyl) | 152 | Water-alcohol-soluble, ether-insoluble. |
| 1841 | —H | 139 | Water-alcohol-soluble, ethyl acetate-insoluble. |
| 1863 | —H$_2$C—CH(CH$_3$)$_2$ | 166 | Do. |
| 1864 | —C$_7$H$_{15}$ | 143 | Water-alcohol-soluble, ether-insoluble. |
| 1870 | —CH$_2$—CH$_2$—CH(CH$_3$)$_2$ | 157 | Do. |
| 1872 | —CH$_3$ | 168 | Water-alcohol-soluble, ethyl-acetate insoluble. |
| 1920 | —C$_6$H$_{13}$ | 149 | Water-soluble. |
| 1921 | —C$_5$H$_{11}$ | 134 | Do. |
| 1922 | —C$_3$H$_7$ | 183 | Do. |
| 1953 | —CH$_2$—CH$_2$—φ | 246 | Slightly water-soluble. |

In order to illustrate the medicinal properties of the products according to the invention, details of the pharmacodynamic studies carried out on compounds of Formula VIII are given below:

EXAMPLE 12

2-(3-trifluoromethyl)phenyl 4-isopropyl-tetrahydro-1,4-oxazine (product of Example 1—reference 1766)

Trials were carried out on the abovementioned product in the form of a hydrochloride of the formula:

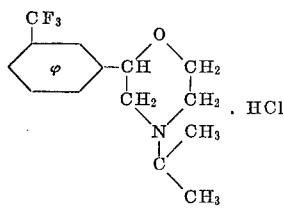

Said hydrochloride consists of ether-insoluble, water and alcohol-soluble white crystals. Melting point=164° C.

This compound is an active medicinal agent, having essentially a tranquilizing effect, and further possessing powerful antiinflammatory properties as well as a distinct analgesic action.

The pharmacodynamic properties of this new medicament are illustrated by the following trials:

Acute toxicity

The LD 50 was calculated by the Behrens and Karber method (Arch. Exp. Path. Pharm. 177, 379, 1935).

Administered orally to the mouse, the LD 50 is 365 mg./kg.; intraveneously it is 90 mg./kg.

Tranquilizing properties

The tranquilizing properties of the new medicament were studied and compared with those of a known tranquilizer, chlorodiazepoxide hydrochloride, a medicament available on the market under the name of "Librium."

(a) The effect on the spontaneous motility of the mouse.

Protocol.—Male animals weighing between 17 and 20 grams are grouped into batches of ten, and after two hours without food, the product to be studied (treated animals), or an equivalent amount of the solvent used (control animals) is administered by esophageal intubation.

One hour after administration of the product or solvent, pairs of the animals are placed in a circular passageway. The latter is scanned by six beams of infra-red light. The beams are radiary, equidistant and each is centered on a photoelectric cell.

Each time a beam is broken by an animal passing through it, this is registered on a meter. The number of breaks, or the movements of the two animals, is read after ten minutes. The results obtained with treated animals are given in the form of a percentage increase or decrease with respect to those obtained with the controls.

The ED 50 is the dose which reduces the number of movements of treated animals by 50% with respect to those of control animals. It is expressed in mg./kg.

The results are given in Table I.

TABLE I.—ED 50

| | Mg./kg. |
|---|---|
| Product according to the invention | 95 |
| Chlordiazepoxide HCl | 65 |

(b) The potentiation of an inactive dose of a sedative and hypnotic barbituric product, Mebubarbital, also known as "Nembutal" or "Pentobarbital."

Protocol.—In a first step, batches of ten male mice having an average weight of 23 grams and kept without food for two hours, are given an intraperitoneal injection of mebubarbital to discover the maximum dose which does not cause the loss of the righting reflex in each of the animals.

In a second step, the animals grouped into batches of ten are given the dose of mebubarbital determined in the first step 30 minutes after per os administration of the product to be studied. The number of mice that sleep for longer than 15 minutes is then noted.

The ED 50 is the dose which causes sleep in 50% of the treated animals with respect to controls. It is expressed in mg./kg. The results are given in Table II.

TABLE II.—ED 50

| | Mg./kg. |
|---|---|
| Product according to the invention | 75 |
| Chlordiazepoxide HCl | 12 |

(c) Effect on the rat which has been rendered aggressive by electrical stimulation Principle.—The repetitive electrical stimulation of two rats in a single cage causes aggressive behaviour in the animals, this phenomenon being abolished by tranquilizers. (G. J. Siou, Physiol., Paris 1958, 50, 504–5). The efficiency of the tranquilizer is assessed by the decrease in aggressivity in the treated rat.

Method.—Male animals (Wistar strain) weighing between 250 and 300 grams are separated into batches of six. One half-hour oral administration of the product or solvent (control), pairs of animals are placed in a 24 x 12 x 34 cm. cage, with a floor of parallel steel bars running lengthwise and connected in pairs.

One hour, and one hour and a half after administration of the product the animals are stimulated for one and one half minutes, the flow of current lasting for 25 ms. with a 110 v. current at a frequency of 50 Hz.

The following observations are noted for each group of animals:

If, during each stimulation period, the two rats face each other standing on their back legs or not, If this attitude, known as "boxing rats" is abandoned as soon as stimulation ceases, or persists less than two minutes after the flow of current has stopped, or lasts longer.

The observer is unaware of the distribution of different groups in the same batch, control or treated animals, in the battery of cages, and all the results previously obtained in a given group.

Upon each flow of current he attributes:

Firstly, the value 0 or 1 to the absence or presence of aggressive behaviour during stimulation;

Secondly, after stimulation, the value 0 to the non-persistance of the attitude previously described, and value 1 or 2 respectively to the persistance of the same attitude for less than two minutes or for longer.

The values obtained during two stimulations of each of the three pairs constituting a batch are added together. From a determined score, the percentage of decrease in the agressivity of the batches treated is calculated with respect to the control batch.

The dose at which aggressiveness is decreased by 50% with respect to controls (ED 50) is determined from the straight line log dose/response.

The results obtained are shown in Table III.

TABLE III.—ED 50

| | Mg./kg. |
|---|---|
| Product according to the invention | 6.5 |
| Chlordiazepoxide HCl | 30 |

(3) Antiinflammatory properties.—These properties were tested on the rat according to the method described by G. Wilhelmi and R. Domenjoz, Arzneimittel Forsch 1 151 (1951). The medicament of the invention was compared with phenylbutazone.

The anti-phlogistic effect is studied, on the rat, with respect to the acute stage of inflammation (characterized by the intensity of vascular reactions).

Inflammation is induced by subaponeurotic injection of kaolin (0.15 ml. solution at 10%) in the back paw, and the edematous reaction is measured regularly in time by plethylsmography (modified Giono and Chevillard apparatus).

The comparison of the volume of the paw before and after injection enables the intensity of inflammation to be assessed and calculated according to the formula:

$$\text{Percent increase in paw volume} = \frac{\text{inflammatory paw volume}}{\text{initial volume}} \times 100$$

The substance being studied is administered per os thirty minutes before injection of the irritant substance.

The results (Table IV) are expressed as the percentage of swelling inhibition in treated animals with respect to controls (100%).

TABLE IV

| Product | Dose, mg./kg. | Reduction of the edema in percent | Planimetric value |
|---|---|---|---|
| According to the invention | 100 | 87 | 460 |
| Phenylbutazone (comparison) | 100 | 49 | 270 |

(4) Analgesic properties.—The product being administered orally, analgesic activity in the mouse was studied by two methods:

(a) Caloric stimulus.—N. B. Eddy and D. Leimbach's method (J. Pharmacol. Exp. Ther. 107: 385–393, 1953). See also J. Y. P. Chen and H. Beckmann [Science 113 63 (1951)].

Pain is induced in the mouse by caloric contact stimulation.

The animals are placed on a plate maintained at a constant temperature (56°5) by ebullient acetone, and the reaction time to the painful stimulus is noted. This consists in licking the back paws.

The increase, in seconds of the exposure time of treated animals with respect to controls provides the degree of the analgesic effect of the substance studied.

This substance is administered orally (esophageal intubation) 30 minutes before the test, at different doses, to batches of fourteen animals.

(b) Chemical stimulus.—Koster's method modified by Witkin [R. Koster, M. Anderson and E. J. De Beer Fed. Proc. 18:412 (1959)—L. B. Witkin, C. F. Hebner, F. Galdi, E. O'Keefe, P. Spitaletta and A. J. Plummer J. Pharmacol. Exp. Ther. 133: 400–408 (1961)].

In the mouse, pain is induced by intraperitoneal injection of acetic acid (300 mg./kg. of a 3% solution).

This injection induces characteristic attacks of pain (twisting of the body, stretching of the back legs) which are counted for twenty minutes in a group of six to eight animals.

The number of attacks in treated animals compared with controls provides the degree of analgesic action which is calculated according to the following formula:

Percent analgesia:

$$\frac{\text{Number of attacks in controls} - \text{Number of attacks in treated animals}}{\text{Number of attacks in controls}} \times 100$$

Various doses of the substance being studied are administered orally (esophageal intubation) thirty minutes before the test. The ED 50 expressed in mg./kg., represents the dose which decreases the number of attacks of pain in treated animals by 50% with respect to controls.

The results obtained are given in table V.

TABLE V.—ED 50

| | Mg./kg. |
|---|---|
| Caloric stimulus | 125 |
| Chemical stimulus | 150 |

The above results show that the medicament of the invention possesses, principally, the property of calming and relaxing subjects in states of emotional difficulty and anxiety. Its main therapeutic indications are: characterial instability, behavioral disturbances, aggressiveness.

The new medicament can be administered in the form of tablets containing 10 to 40 mg. of the product for adults, the preferential dose being 20 mg. and containing 3 to 10 mg. for children, the preferential dose being 5 mg.; in these tablets the active principle is associated with the usual excipients: starch, talc, magnesium stearate.

Taking the same average dose given above as a basis, the new medicament according to the invention can also be put up in the conventional manners used for oral administration to form capsules, gelules, delayed action tablets etc. The active principle of the invention can also be administered intravenously if necessary.

EXAMPLES 13 and 14

The trials described below relate to:

(1°) 2-(3-trifluoromethyl)phenyl tetrahydro 1,4-oxazine hydrochloride of the formula:

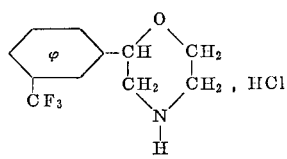

in the form of a water- and alcohol-soluble, ethyl acetate-insoluble white crystalline powder; M.P.=139° C. Identification number: 1841.

(2°) 2-(3-trifluoromethyl)phenyl, 4-methyl tetrahydro-1,4-oxazine of the formula:

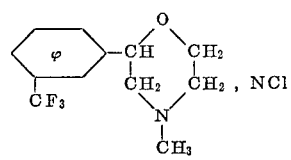

in the form of a water and alcohol-soluble, ethyl acetate-insoluble white crystalline powder M.P.=168° C. Identification number=1872.

The pharmacodynamic properties of compounds 1841 and 1872 were proved by the following tests:

(1) Acute toxicity

The LD 50 was tested orally and intravenously on the mouse, and calculated according to the Behrens and Karber method (Arch. Exp. Path. Pharm. 177, 379, 1935).

| Product | Administered orally (mg./kg.) | Administered intravenously |
|---|---|---|
| 1841 | 600 | 70 |
| 1872 | 1,300 | 110 |

(2) Tranquilizing properties compared to those of chlordiazepoxide hydrochloride (a) Effect on the spontaneous motility of the mouse Protocol.—Male animals weighing between 17 and 20 grams are grouped into batches of ten and, after two hours without food, the product to be studied (treated animals) or an equivalent amount of the solvent used (control animals) is adiminstered by esophageal intubation.

One hour after administration of the product or solvent, the animals are placed by pairs in a circular passage. This passage is scanned by six infra-red light beams. The beams are radiary, equidistant and each is centered on a photoelectric cell. Each time a beam is broken by an animal passing through it, this is registered on a meter. The number of breaks, or the movements of the two animals, is read after ten minutes. The results obtained with treated animals are given in the form of a percentage increase and decrease with respect to those obtained with the controls.

The ED 50 is the dose that reduces the number of movements of treated animals by 50% with respect to those of controls. It is expressed in mg./kg.

Product                                      ED 50
    1841 ------------------------------ 80 mg./kg.
    1872 _____the ED 50 is only attained on 80 mg./kg.
    Chlordiazepoxide HCl -------------- 65 mg./kg.

(b) The potentiation of an inactive dose of mebubarbital

Protocol.—In a first step, batches of ten male mice having an average weight of 23 grams and kept without food for two hours, are given an intraperitoneal injection of mebubarbital to discover the maximum dose which does not cause the loss of the righting reflex in each of the animals.

In a second step, the animals grouped into batches of ten are given the dose of mebubarbital determined in the first step 30 minutes after per os administration of the product to be studied. The number of mice that sleep for longer than 15 minutes is then noted.

The ED 50 is the dose which causes sleep in 50% of the treated animals with respect to controls. It is expressed in mg./kg.

Product                                     ED 50
    1841 ---------- At 80 mg./kg., no potentialisation
    1872 ------------------------- 100 mg./kg.
    Chlordiazepoxide HCl
      (témoin) ---------------------- 12 mg./kg.

(c) Effect on the rat which has been rendered aggressive by electrical stimulation (G. Siou—J. Physiol. Paris, 1958, 50, 504–5).

The dose at which aggressiveness is decreased by 50% with respect to controls (ED 50) is determined from the straight line log dose/response.

Product:                                ED 50
    1841 ----------------------------- 2 mg./kg.
    1872 ---------------------------- 15 mg./kg.
    Chlordiazepoxide HCl (control) ------ 30 mg./kg.

(3) Anti-inflammatory properties

These properties were tested on the rat according to the method described by G. Wilhelmi and R. Domenjoz, Arznemittel Forsch, 1:151 (1951), the product being administered orally.

The results are expressed as the percentage of swelling inhibition in treated animals with respect to control (100%).

| Product | Dose, mg./kg. | Decrease of the edema (percent) | Planimetric value |
|---|---|---|---|
| 1841 | 100 | 100 | 542 |
| 1872 | 100 | 74 | 356 |
| Phenylbutazone (control) | 100 | 49 | 270 |

(4) Analgesic properties

The product being administered orally, analgesic activity in the mouse was studied by two methods:

(a) Caloric stimulus.—N. B. Eddy and D. Leimbach's method (J. Pharmacol, Exp. Ther. 107:385–393, 1953).

(b) Chemical stimulus.—Koster's method modified by Witkin [R. Koster, M. Anderson and E. J. De Beer, Fed. Proc., 18:412 (1959)—L. B. Witkin, C. F. Heubner, F. Caldi, E. O. Keefe, P. Spitaletta and A. J. Plummer, J. Pharmacol. Exp. Ther., 133 400–408 (1961)].

The ED 50 expressed in mg./kg. represents the dose which decreases the number of attacks of pain in treated animals by 50% with respect to controls.

| Product | ED 50 Caloric stimulus, mg./kg. | ED 50 chemical stimulus, mg./kg. |
|---|---|---|
| 1841 | 110 | 60 |
| 1872 | 280 | 280 |

The products according to the invention possess, principally, the property of calming and relaxing subjects in the state of emotional difficulty and anxiety. Their main therapeutic indications are: characterial instability, behavioral disturbances and aggressiveness. They further possess strong antiinflammatory properties as well as a distinct analgesic action.

These products, in association with the usual excipients, starch, talc, magnesium stearate, can be administered to human beings for example, in the form, of tablets.

The daily therapeutic dose of compound (I) is from 2 to 50 mg. for adults, the preferential dose being 10 mg., and 0.5 to 10 mg. for children, the preferential dose being 2.5 mg.

EXAMPLES 15 TO 21

The trials described below relate to compounds of Formula VIII above mentioned wherein R is a cyclohexyl, allyl, n-butyl, benzyl, isobutyl, heptyl or isopentyl, radical and wherein $X_1$ is a —$CF_3$ group in the meta position.

In Table A hereinabove, said products have the following identification numbers: 1967, 1784, 1785, 1786, 1863, 1864 and 1870. Their physico-chemical characteristics are given in Table A.

This group of new chemical compounds is therapeutically useful as these compounds possess a tranquilizing effect as well as an anti-inflammatory and analgesic action.

The pharmacodynamic properties of the new compounds have been disclosed by the following tests:

(1) Acute toxicity

The LD 50 was tested orally on the mouse and calculated according to the Behrens and Karber method (Arch. Exp. Path. Pharm. 177, 379, 1935).

The results are given in Table 2.

TABLE 2

| Product: | Oral administration to the mouse. LD 50 (mg./kg.) |
|---|---|
| 1767 | →3000 |
| 1784 | #1700 |
| 1785 | 1730 |
| 1786 | 1700 |
| 1863 | 1190 |
| 1864 | #3000 |
| 1870 | #2000 |

(2) Tranquilizing properties compared to those of chlordiazepoxide hydrochloride (available on the market as Librium)

(a) Effect on the spontaneous motility of the mouse

Protocol.—Male animals weighing between 17 and 20 grams are grouped into batches of ten and, after two hours without food, the product to be studied (treated animals) or an equivalent amount of the solvent used (control animals) is administered by esophageal intubation.

One hour after administration of the product or solvent, the animals are placed by pairs in a circular passage. This passage is scanned by six infra-red light beams. The beams are radiary, equidistant and each is centered on a photoelectric cell. Each time a beam is broken by an animal passing through it, this is registered by a meter. The number of breaks, or the movements of the two animals, is read after ten minutes. The results obtained with treated animals are given in the form of a percentage increase and decrease with respect to those obtained with the controls.

In a second step, the animals grouped into batches of movements of treated animals by 50% with respect to those, of controls. It is expressed in mg./kg.

The results obtained are given in Table 3.

TABLE 3

| Product: | ED 50 |
|---|---|
| 1767 | The ED 25 is only attained at 80 mg./kg. |
| 1784 | No action at 160 mg./kg. |
| 1785 | No action at 160 mg./kg. |
| 1786 | No action at 160 mg./kg. |
| 1863 | No action at 160 mg./kg. |
| 1864 | No action at 120 mg./kg. |
| 1870 | No action at 160 mg./kg. |
| Chlordiazepoxide HCl | 65 mg./kg. |

(b) Potentiation of an inactive dose of mebubarbital

Protocol.— In a first step, batches of ten male mice having an average weight of 23 grams and kept without food for two hours, are given an intraperitoneal injection of mebubarbital to discover the maximum dose which does not cause the loss of the righting reflex in each of the animals.

In a second step, the animals groups into batches of ten are given the dose of mebubarbital determined in the first step 30 minutes after per os administration of the product to be studied. The number of mice which sleep for longer than 15 minutes is then noted. Table 4 shows the results obtained with a dose of 80 mg./kg.

TABLE 4

| Product: | At 80 mg.kg. per os |
|---|---|
| 1767 | 2 out of 10 |
| 1784 | 1 out of 10 |
| 1785 | 3 out of 10 |
| 1786 | 2 out of 10 |
| 1863 | 0 out of 10 |
| 1864 | 0 out of 10 |
| 1870 | 0 out of 10 |
| Chlordiazepoxide HCl | 7 out of 10 |

(c) Effect on the rat which has been rendered agressive by electrical stimulation. (G. Siou, J. Physiol., Paris, 1958, 50, 504–5).

The product is administered orally to batches of six animals.

The doses at which aggressiveness is decreased by 100% with respect to controls (ED 100) is determined from the straight line log dose/response.

TABLE 5

| Product: | ED 100 less than, mg./kg. |
|---|---|
| 1767 | 200 |
| 1784 | 50 |
| 1785 | 25 |
| 1786 | 25 |
| 1863 | 10 |
| 1864 | 60 |
| 1870 | 100 |
| Chlordiazepoxide HCl | 60 |

(d) Effect on mice made aggressive by electrical stimulation (C. Y. Yen, L. Stanger and N. Millman (1959) Arch. Inteen. Pharmacodyn 123, 179).

The product is administered orally to batches of six animals.

The dose at which aggressiveness is decreased by 50% with rsepect to controls (ED 50) is determined from the straight line log dose/response.

TABLE 6

| Product: | ED 50, mg./kg. |
|---|---|
| 1767 | 27.5 |
| 1784 | 13 |
| 1785 | |
| 1786 | ≃30 |
| 1863 | 15 |
| 1864 | ≃30 |
| 1870 | 23 |
| Chlordiazepoxide HCl | ≃80 |

(3) Antiinflammatory properties

These properties were tested on the rat according to the method described by G. Wilhelmi and R. Domenjoz, Arzneimittel Forsch, 1:151 (1951) the product being administered orally.

The results are expressed as the percentage of swelling inhibition in treated animals with respect to controls (100%).

TABLE 7

| Product | Dose, mg./kg. | Decrease in edema, percent | Planimetric value |
|---|---|---|---|
| 1767 | 100 | 61.5 | 346 |
| 1784 | 100 | 66.5 | 246 |
| 1785 | 50 | 66 | 288 |
| 1786 | 50 | 13 | 42.5 |
| 1863 | 50 | 39 | 138.5 |
| 1864 | 100 | 48 | 148.5 |
| 1870 | 100 | 66.5 | 311 |
| Phenyl butazone | 100 | 49 | 270 |

(4) Analgesic properties

The product being administered orally, analgesic activity in the mouse was studied by two methods:

(a) Caloric stimulus

N. B. Eddy and D. Leimbach's method (J. Pharmacol. Exp. Ther. 107:385—393, 1953).

(b) Chemical stimulus

Koster's method modified by Witkin [R. Koster, M. Anderson and E. J. De Beer, Fed. Proc. 18, : 412 (1959)—L. B. Witkin, C. F. Heubner, F. Caldi, E. O'Keefe, P. Spitaletta and A. J. Plummer. J. Pharmacol. Exp. Ther., 133 : 400–408 (1961)].

The ED 50 expressed in mg./kg. represents the dose which decreases the number of attacks of pain in treated animals by 50% with respect to controls.

TABLE 8

| Product | ED 50 caloric stimulus, mg./kg. | ED 50 chemical stimulus, mg./kg. |
|---|---|---|
| 1767 | #500 | 300. |
| 1784 | 125 | 50. |
| 1785 | Subactive>300 | 300. |
| 1786 | Inactive | Subactive. |
| 1863 | do | ≃200. |
| 1864 | do | Inactive. |
| 1870 | Subactive | 200. |

The products according to the invention posses, principally, the property of calming and relaxing subjects in states of emotional tension and anxiety. Their main therapeutic indications are: characteral instability, behavioural disturbances, aggressiveness.

These products, associated with the usual excipients: starch, talc, magnesium stearate, can be administered as tablets. They can also be administered orally in the form of capsules, gelules, sugar-coated pills, etc. in association with the usual excipients.

The daily adult dose is between 2 and 50 mg. per day, and preferably 10 mg. per day.

Moreover, the new compounds, as medicaments, can be administered rectally in the form of suppositories, rectal capsules etc., as well as injection in association with physiologically acceptable excipients. The daily therapeutic doses which can be used are the following.

rectal route: from 10 to 100 mg. of active agent
injection: from 2 to 50 mg. of active agent.

Generally speaking, in the therapeutic field, the new compounds possess an activity on the central nervous system.

Other representative compounds of the invention have been subjected to the above mentioned pharmacodynamic trials. All the results obtained are given in the following Table B, as well as the results which have already been given, in order to provide an overall view of the properties of the new compounds as medicaments.

It will be seen that, in Table B, the action on the rat rendered aggressive has been noted by the value ED 50.

Toxicity has been indicated by the value LD 50 administered orally. However, in the case of products identified as 1920, 1921, 1922, and 1955 the LD 50 has not been given, but the number of dead mice per batches of 10 mice is given for a dose of 900 mg./kg. of the orally administered product.

The invention is not limited by the preceeding examples. More particularly, during the third step of the process described hereinabove, various primary amines of the formula R—$NH_2$ can be used. These modes of proceedure remain within the scope of the invention.

TABLE B

| Identification number | Acute toxicity, V.O.* (mg./kg.) | Tranquilizing properties | | |
|---|---|---|---|---|
| | | Spontaneous motility in the mouse | | Potentiation of an inactivated dose of Mebubarbital [1] |
| 1766 | 365 | ED 50=95 mg./kg. | | [2] 5/10 |
| 1767 | >3,000 | ED 25=80 mg./kg. | | 2/10 |
| 1784 | #1,700 | No action at 160 mg./kg. | | 1/10 |
| 1785 | 1,730 | do | | 3/10 |
| 1786 | 1,700 | do | | 2/10 |
| 1841 | 600 | ED 50=80 mg./kg. | | 0/10 |
| 1863 | 1,190 | No action at 160 mg./kg. | | 0/10 |
| 1864 | #3,000 | No action at 120 mg./kg. | | 0/10 |
| 1870 | #2,000 | No action at 160 mg./kg. | | 0/10 |
| 1872 | 1,300 | ED 25=80 mg./kg. | | [3] 6/10 |
| 1920 | **900-1/10 | | | 0/10 |
| 1921 | **900-2/10 | | | 0/10 |
| 1922 | **900-2/10 | | | 1/10 |
| 1953 | **900-1/10 | ED 50=80 mg./kg. | | |
| Chlordiazepoxide (control) HCl | | ED 50=65 mg./kg. | | [4] 7/10 |
| Phenylbutazone (control) | | | | |

| Identification number | Tranquilizing properties | | Anti-inflammatory properties, doses (mg./kg.) |
|---|---|---|---|
| | Action on the aggressive rat, ED 50 (mg./kg.) | Action on the aggressive mouse, ED 50 (mg./kg.) | |
| 1766 | 6.5 | 7.2 | 100 |
| 1767 | ≃100 | 27.5 | 100 |
| 1784 | ([5]) | 13 | 100 |
| 1785 | ≃15 | | 50 |
| 1786 | ≃8 | ≃30 | 50 |
| 1841 | 2 | 4.5 | 100 |
| 1863 | ≃7 | 15 | 50 |
| 1864 | ≃30 | ≃30 | 100 |
| 1870 | ≃20 | 23 | 100 |
| 1872 | 15 | 11 | 100 |
| 1920 | | 10 | 100 |
| 1921 | ([5]) | 10 | 100 |
| 1922 | ([5]) | 10 | 100 |
| 1953 | | ≃20 | 100 |
| Chlordiazepoxide (control) HCl | 30 | 80 | |
| Phenylbutazone (control) | | | 100 |

| Identification number | Anti-inflammatory properties | | Analgesic properties | |
|---|---|---|---|---|
| | Decrease in the edema (percent) | Planimetric value | Calorie stimulus, ED 50 (mg./kg.) | Chemical stimulus, ED 50 (mg./kg.) |
| 1766 | 87 | 460 | 125 | 150 |
| 1767 | 61.5 | 346 | #500 | 300 |
| 1784 | 66.5 | 246 | 125 | 50 |
| 1785 | 66 | 288 | Subactive >300 | 300 |
| 1786 | 13 | 42.5 | Inactive | Subactive |
| 1841 | 100 | 542 | 110 | 60 |
| 1863 | 39 | 138.5 | Inactive | ≃200 |
| 1864 | 48 | 148.5 | Inactive | Inactive |
| 1870 | 66.5 | 311 | Subactive | 200 |
| 1872 | 74 | 356 | 280 | 280 |
| 1920 | 43.5 | 209 | Inactive | ≃400 |
| 1921 | 58.5 | 301 | 150 | 80 |
| 1922 | 82.5 | 469.5 | 450 | 80 |
| 1953 | 15 | 27 | Inactive | ≃500 |
| Chlordiazepoxide (control) HCl | | | | |
| Phenyl butazone (control) | 49 | 270 | Inactive | 350 |

[1] Dose=80 mg./kg., number of animals which sleep longer than 15 minutes.
[2] ED 50=75 mg./kg.
[3] ED 50=100 mg./kg.
[4] ED 50=12 mg./kg.
[5] Decrease of 100% at 50.
*V.O.=administered orally.
**Dose of 900 mg./kg., number of mice that died per batches of 10 mice.

We claim:
1. A 2,4-disubstituted tetrahydro-1,4 oxazine compound having the formula

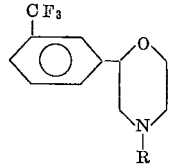

wherein R is hydrogen, alkyl having from 1 to 7 carbon atoms, cyclohexyl, allyl, benzyl or phenethyl.
2. The product of claim 1 wherein R is methyl.
3. The product of claim 1 wherein R is isopropyl.
4. The product of claim 1 wherein R is butyl.
5. The product of claim 1 wherein R is isopentyl.
6. The product of claim 1 wherein R is heptyl.

References Cited

UNITED STATES PATENTS 3,155,656  11/1964  Goshorn et al. _____ 260—247

OTHER REFERENCES

Chemical Abstracts vol. 56, p. 2459a (1962).
Chemical Abstracts vol. 56, p. 4777 f (1962).
Harry L. Yale J. of Medicinal Chemistry, vol. 1, No. 2 (1959) pp. 121–133.

ALEX MAZEL, Primary Examiner

JOSE TOVAR, Assistant Examiner

U.S. Cl. X.R.

424—248